United States Patent [19]

Stevenson

[11] Patent Number: 4,513,640
[45] Date of Patent: Apr. 30, 1985

[54] TRANSMISSION SHIFT CONTROL

[75] Inventor: Paul D. Stevenson, Ann Arbor, Mich.

[73] Assignee: General Motors Corporation, Detroit, Mich.

[21] Appl. No.: 503,063

[22] Filed: Jun. 10, 1983

[51] Int. Cl.$^3$ ............................................... B60K 41/16
[52] U.S. Cl. ...................................... 74/870; 74/877; 74/869
[58] Field of Search ................... 74/869, 868, 870, 877

[56] References Cited

U.S. PATENT DOCUMENTS

| | | | |
|---|---|---|---|
| 3,605,525 | 9/1971 | Pierce et al. | 74/869 |
| 3,625,090 | 12/1971 | Chana | 74/869 |
| 3,818,783 | 6/1974 | Norris et al. | 74/869 |
| 4,065,985 | 1/1978 | Taga | 74/869 |
| 4,248,106 | 2/1981 | Iwanaga et al. | 74/869 X |
| 4,369,677 | 1/1983 | Lewis | 74/868 X |
| 4,418,587 | 12/1983 | Kauffman | 74/867 |

Primary Examiner—George H. Krizmanich
Assistant Examiner—Dirk Wright
Attorney, Agent, or Firm—Donald F. Scherer

[57] ABSTRACT

A shift control for a four-speed automatic transmission has a hydraulic pump for supplying pressurized fluid to the control valves including a manual valve, a 1-2 shift valve and a throttle valve. The manual valve directs fluid to a low pressure regulator valve during automatic four-speed drive operation and to a governor valve during all forward drive operations. The 1-2 shift valve responds to throttle valve pressure and the higher of governor pressure or the output of the low pressure regulator valve during automatic four-speed drive operation, whereby on part-throttle acceleration, the 1-2 shift valve is upshifted by the output of the low pressure regulator valve so that a second gear start for the vehicle is provided. In full throttle acceleration, the transmission starts in first gear due to the increased throttle pressure bias to provide better vehicle performance.

2 Claims, 1 Drawing Figure

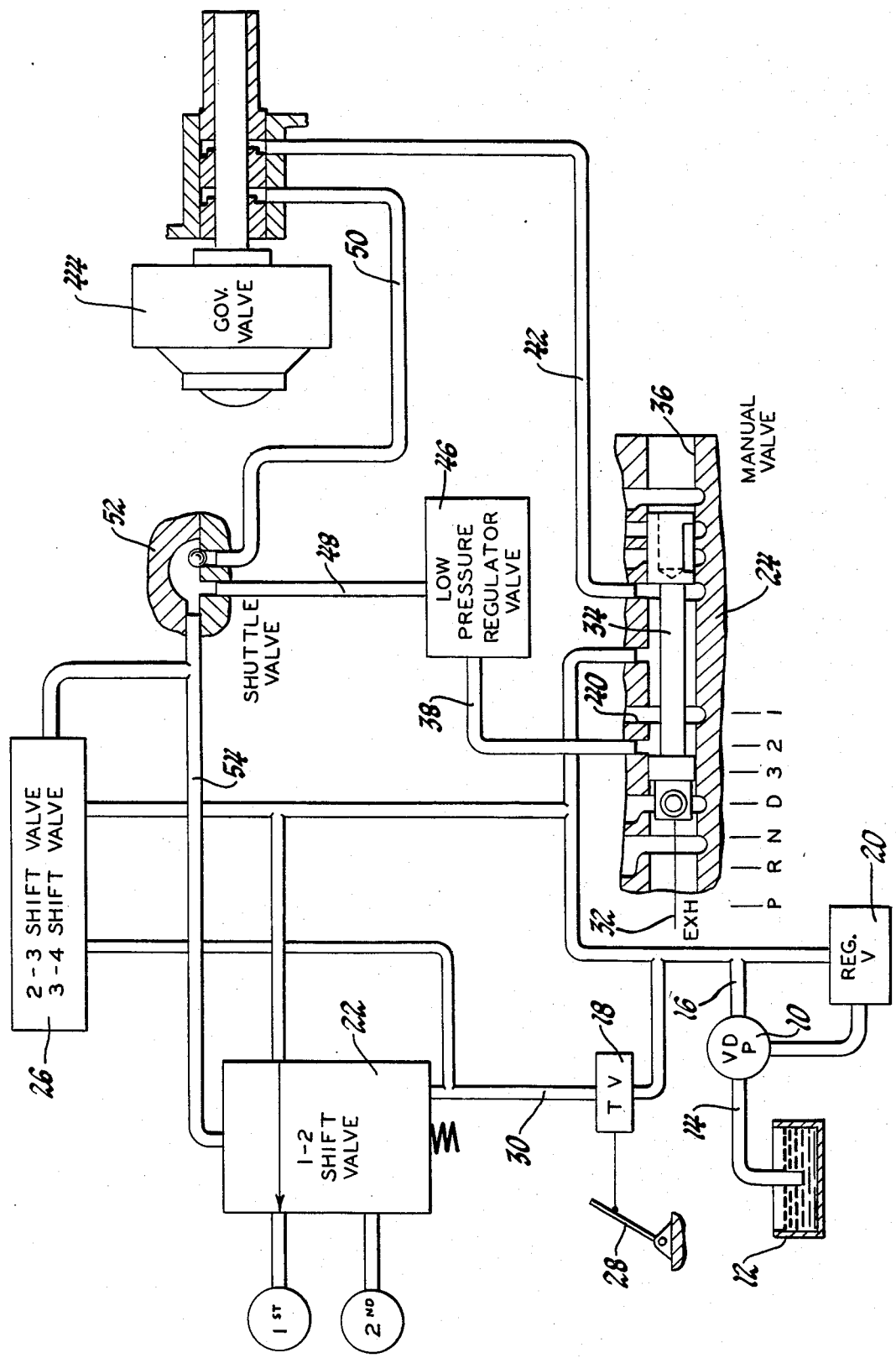

TRANSMISSION SHIFT CONTROL

This invention relates to hydraulic controls for automatic transmissions and more particularly to such controls having a changeable automatic shift pattern.

It is an object of this invention to provide an improved hydraulic control system for an automatic ratio changing transmission having at least four forward speeds, a shift valve for controlling the first to second gear interchange which is responsive to a throttle value pressure and the higher of a regulated pressure or a variable governor pressure such that during automatic drive selection, the transmission will be conditioned for second gear start at part-throttle operation and for first gear start at full throttle operation.

It is another object of this invention to provide an improved hydraulic transmission control system wherein the manual control valve is operable in the highest drive range to direct fluid pressure to a low pressure regulator valve, the output of which is delivered to a shuttle valve which is operable to direct the higher of said regulated pressure or governor pressure to a throttle pressure responsive 1-2 shift valve, thus providing an upshift bias which will condition the shift valve for second gear operation at part-throttle operation and first gear operation at full throttle operation.

These and other objects and advantages of the present invention will be more apparent from the following description and drawing which is a schematic representation of a portion of an automatic transmission control mechanism.

The portion of the control mechanism shown includes an engine driven variable displacement hydraulic pump 10 which draws fluid from a reservoir 12 through an inlet passage 14 and delivers fluid under pressure to a high pressure or main line passage 16. The passage 16 is in fluid communication with a throttle valve 18, a conventional pressure regulator valve 20, a conventional 1-2 shift valve 22 and a manual valve 24. The main line passage 16 is also connected to the 2-3 and 3-4 shift valves 26.

The throttle valve 18 is operatively connected to a manual throttle pedal 28 in a well-known manner to provide a pressure output which is proportional to the throttle position. Such controls are well-known in the art. The pressure output of throttle valve 18 is directed to a throttle pressure passage 30 which is operatively connected to the 1-2 shift valve 22 and to the 2-3 and 3-4 shift valves 26.

As is well-known, the throttle pressure urges the shift valves to the downshifted or lower speed ranges. The shift valves are normally assisted in the downshifted position by a spring member such that at engine start, the transmission will be conditioned for the lowest speed range.

The manual valve 24 is controlled in a well-known manner by a manual cable 32. The cable 32 is controlled by the operator to adjust the manual valve to a plurality of operating positions including Park "P", Reverse "R", Neutral "N", Drive "D", 3, 2 and 1. The "D" position conditions the transmission for a second gear start except at high throttle angles where a start in first gear occurs with second, third and fourth available. The 3 position provides a first gear start with first, second and third available. The 2 and 1 positions have first gear starts with first and second gears available but in 1 position, the 1-2 shift is delayed.

The manual valve 24 has a spool member 34 connected to the operator cable 32 so as to be selectively positionable within a valve bore 36. The manual valve 24 is shown in the "D" position such that the fluid pressure in main line 16 is connected to passages 38, 40 and 42. The passage 40 is connected to components of the control system which are not shown at this point as they are not necessary to the understanding or operation of the present invention.

The passage 42 is connected to a governor valve 44 and the passage 38 is connected to a low pressure regulator valve 46. The low pressure regulator valve 46 may be in the form of any of the well-known pressure reducing downstream pressure regulator valves. Such valves are well-known and operable to provide an output pressure which is maintained at a fixed level below the inlet pressure. For example, in the drive position shown, the fluid pressure in passage 38 would be equal to main line pressure which can vary from 75 psi to 200 psi. During this operation, the low pressure regulator valve 46 is designed to have a constant output pressure, for example, 12 psi, which is delivered to a fluid passage 48.

The governor valve 44 operates in a well-known manner to provide an output pressure in passage 50 which is proportional to the output speed of the transmission. The governor pressure in passage 50 is delivered to a shuttle valve 52 and to the shift valves 26. The shuttle valve 52 is also connected to the passage 48 and to an outlet passage 54. The shuttle valve is constructed such that the higher pressure between passages 48 and 50 is delivered to passage 54. The passage 54 is connected to the 1-2 shift valve 22 to provide an upshift bias to the valve.

In the drive position shown, with the vehicle at rest, the pressure in passage 48 will be greater than the pressure in passage 50 and will therefore be directed by the shuttle valve 52 to the 1-2 shift valve 22 to cause an upshift to the second gear position. If the operator starts the vehicle moving with only part-throttle operation, the pressure in passage 30 will not be sufficient to overcome the upshift bias in passage 54 such that the vehicle will start in second gear and will automatically upshift to third and fourth gears in a well-known manner.

If, however, the operator should desire high vehicle performance such that the throttle pedal 28 is fully depressed, the pressure in passage 30 will be significantly greater than the pressure in passage 54 such that the vehicle will start in first gear. A 1-2 upshift will not occur under these conditions until the pressure in the governor passage 50 is sufficiently great to overcome the pressure in passage 48 and also overcome the downshift bias on the 1-2 shift valve 22. Therefore, during part-throttle operation, the vehicle will operate automatically in second through fourth gears. This provides improved fuel economy and also reduces the busyness of the transmission in that it eliminates the 1-2 and 2-1 part-throttle shifts which might occur.

However, should the operator desire higher performance, this is attained by simply depressing the throttle pedal 28 sufficiently to obtain a first gear start. While the above is described as being a full throttle start for full performance, the break point or dividing line between first and second gear starting can be controlled to be at any percent throttle through judicious selection of the performance curve for the throttle valve 18 and the pressure output of valve 46.

When the manual valve is in the 3 position, the oil feed to passage 38 is blocked and an exhaust of passage 38 is opened through the left end of valve bore 36. This ensures that the pressure in passage 54 will be the same as passage 50 thus resulting in first gear start.

It will be noted that the manual valve 24 has a number of other passages. These passages are pressurized during various operating conditions to provide valve functions which are not utilized during the transmission operation as described above and is therefore not necessary for an understanding of this invention.

Those skilled in the art will recognize that the above described control functions can be included in many presently available transmission hydraulic control systems for a power transmission including the system described in Ser No. 200,957, filed Oct. 27, 1980, now U.S. Pat. No. 4,418,587 in the name of A. L. Kauffman and assigned to the assignee of this invention.

The embodiments of the invention in which an exclusive property or privilege is claimed are defined as follows:

1. A transmission control for a throttle controlled engine driven multispeed transmission having a low speed ratio and a plurality of higher speed ratios, said control comprising; a source of maximum system pressure; a source of throttle pressure proportional to engine throttle position; a source of governor pressure proportional to transmission output speed; a manual valve hydraulically connected to said maximum pressure source and being movable to a plurality of drive ratio conditions including an automatic drive range; shift valve means hydraulically connected to said source of throttle pressure for controlling the automatic shifting of said transmission between the low speed ratio and the next higher speed ratio; a fixed pressure regulator valve means for supplying a fixed pressure signal less than the pressure supplied by said source of governor pressure at a predetermined transmission output speed and being hydraulically connected to said source of maximum pressure through said manual valve when said manual valve is in said automatic drive range; and valve means for communicating the higher of said fixed pressure or said source of governor pressure to said shift valve means for controlling the shifting thereof, said fixed pressure being sufficient to prevent said shift valve from selecting the low speed ratio when the source of throttle pressure is below a predetermined value whereby the transmission will begin operation in the next higher speed ratio.

2. A transmission control for a throttle controlled engine driven four-speed transmission having a first and lowest speed ratio and three higher speed ratios, said control comprising; a source of maximum system pressure; a source of throttle pressure proportional to engine throttle position; a source of governor pressure proportional to transmission output speed; a manual valve hydraulically connected to said maximum pressure source and being movable to a plurality of drive ratio conditions including an automatic four-speed drive range; first to second shift valve means hydraulically connected to said source of throttle pressure for controlling the automatic shifting of said transmission between the low speed ratio and the next higher speed ratio; fixed pressure reducing type regulator valve means in fluid communication with said manual valve for supplying a fixed pressure signal when said manual valve is in said automatic four-speed drive range; and shuttle valve means for communicating the higher of said fixed pressure or said source of governor pressure to said first to second shift valve means for controlling the shifting thereof, said fixed pressure being sufficient to prevent said first to second shift valve from selecting the first and lowest speed ratio when the source of throttle pressure is below a predetermined value whereby the transmission will begin operation in the next higher or second speed ratio.

* * * * *